Patented Apr. 13, 1937

2,076,875

UNITED STATES PATENT OFFICE 2,076,875

SULPHUR-CONTAINING TERPENES AND METHOD OF PRODUCING

Joseph N. Borglin, Wilmington, and Emil Ott, Elsmere, Del., assignors to Hercules Powder Company, Wilmington, Del., a corporation of Delaware No Drawing. Application April 11, 1935, Serial No. 15,854

26 Claims. (Cl. 260—16)

This invention relates to methods for the production of terpene mercaptans and sulphides.

In accordance with this invention, it has been found possible to effect a reaction between unsaturated terpene compounds and hydrogen sulphide resulting in the formation of terpene mercaptans and sulphides.

The reaction in accordance with this invention involves the addition of hydrogen sulphide at the unsaturated bonds of the terpene compound with the resultant formation, according to the conditions of reaction, of mercaptans or sulphides. Mono-mercaptans will be formed by simple combination between one molecule of hydrogen sulphide and one molecule of unsaturated terpene compound, while by the interaction of several molecules of each reactant or by the reaction of the mercaptans first formed with itself or with the unsaturated terpene compound present, various sulphides or thioethers may be formed. In the presence of any oxidizing agent, as, for example, air, the mercaptans will also be converted into di- or polysulphides. The addition of hydrogen sulphide to more than one double bond will result in the formation of poly-mercaptans.

The unsaturated terpene compounds, which may be, for example, pinene, dipentene, terpinene, terpinolene, terpineol, etc., or mixtures or polymers thereof, will be treated with hydrogen sulphide under suitable conditions. The terpene compound may be dissolved in a non-reactive solvent, as for example, benzene, toluene, butanol, gasoline, etc., or, if liquid at the temperature employed, may be used without a solvent. Hydrogen sulphide will then be passed through the liquid or solution until the reaction is substantially completed, for example, for a period varying from 6 to 72 hours depending upon the conditions of reaction. The use of any particular temperature is not essential to the reaction, but too low a temperature will decrease the rate of reaction unduly, while too high a temperature will tend to cause decomposition of the reaction product. A temperature range of from about 0° C. to about 300° C. is suitable for the reaction, although a range of from about 40° C. to 200° C. is preferred. The reaction will progress at any pressure, but the use of superatmospheric pressure is preferred because of the increased rate of reaction and yield of product so obtained. The pressure may accordingly vary from about atmospheric to about 100 atmospheres, although these limits are in no way critical.

The terpene compounds need not be in the form of pure compounds in order to be treated in accordance with this invention for the production of mercaptans and sulphides, but may be reacted in a crude form. Thus, in place of the several pure terpene compounds, crude natural mixtures of terpene compounds, as for example, turpentine, pine oil, etc. may be used. Or various fractions distilled from these mixtures may be used without the necessity of isolating the several terpene compounds in their pure state. The color of the terpene mercaptans and/or sulphides produced will be made lighter, by giving the terpene compound to be treated an aqueous caustic wash or by steam distilling it in the presence of alkali before mercaptanization.

In particular, certain terpene-containing mixtures which are of little commercial value may advantageously be treated with hydrogen sulphide in accordance with this invention with the production of valuable products.

In various stages of procedure for the production of turpentine and pine oil by the so-called steam and solvent process, fractions or cuts are obtained, which, although they may contain relatively large quantities of valuable terpenes, are commercially worthless because the presence of undesired constituents renders them unsalable. The various constituents of these cuts, valuable and undesirable, have boiling points and solubilities that render their separation by fractional distillation impossible as a practical matter.

Thus, for example, the usual steam and solvent process involves the steam distillation of chipped pine wood for the removal of most of the turpentine and pine oil, followed by the extraction of the steamed chips with, for example, a petroleum fraction similar to gasoline and having a boiling range of 120–160° C. This removes the residual turpentine and pine oil and also rosin. The mixture of turpentine and pine oil obtained by the steam distillation is fractionated into a plurality of cuts. The lowest boiling cut is largely alpha-pinene and is sold as wood turpentine. The next cut is usually termed the para-menthane cut, and contains a rather large quantity of this material, which is objectionable in turpentine. This cut also contains considerable quantities of alpha-pinene and dipentene, as well as some beta-pinene, all of which are valuable and readily salable products. While a refractionation of the para-menthane cut will yield a certain amount of dipentene, some of the dipentene and nearly all of the pinenes cannot be separated from the para-menthane. Hence the remainder of this cut, after separation of some dipentene, is commercially of little value despite its content of valuable terpenes.

Also, when the gasoline solution of turpentine, pine oil and rosin, obtained by extraction of the steamed pine chips, is subjected to fractionation, a plurality of cuts are obtained. These cuts comprise gasoline, a gasoline-terpene mixture, and pine oil, rosin being left as a residue. The gasoline-terpene mixture contains valuable terpenes, chiefly alpha-pinene, together with some dipentene, and beta-pinene, but these terpenes cannot be recovered by fractional distillation and the presence of gasoline renders the cut as a whole of slight value.

When, for example, the terpene mixture constituting the paramenthane cut, described above, is treated in accordance with this invention with hydrogen sulphide, the unsaturated terpenes, such as, dipentene, pinene, etc. present will react with the hydrogen sulphide to form mercaptans or sulphides. The saturated terpenes present, as, for example, para-menthane, will, however, not react, and may readily be removed from the reaction product by distillation or the like.

Similarly, the gasoline-terpene mixture described above may be treated with hydrogen sulphide, which will react with the terpenes present but will not react to any substantial extent with the gasoline. The gasoline may accordingly be removed from the reaction product by, for example, distillation.

Desirably a catalyst will be employed to promote the reaction, although it is to be understood that the use of catalysts is not essential. Suitable catalysts include, for example, acids, such as, sulphuric acid, phosphoric acid, acetic acid, etc.; or their anhydrides, as, phosphorus pentoxide, etc.; bases, such as potassium hydroxide, calcium hydroxide, monoamyl-amine, diamylamine, triamylamine, ethanolamines, aniline, pyridine, etc.; contact catalysts, such as, activated carbon, silica gel, etc.; dimethyl sulphate; metallic aluminum; and metal sulphides. A combination of catalysts, for example, phosphoric acid and silica gel, is often more effective than single catalysts. Desirably, acids will be used as catalysts in the reaction according to this invention, preferably in conjunction with a contact catalyst such as, for example, activated charcoal, silica gel, etc.

The catalyst will desirably be used in an amount about five times that of the terpene compound, although more or less can be used if desired. Smaller amounts of catalysts than this will tend to reduce the rate and yield, while larger amounts will not substantially increase either the rate or yield.

The mineral acid catalysts will desirably be employed in concentrations of from 5 to 100%. For example, sulphuric acid in concentration of 5 to 90% is effective, and phosphoric acid may be used in concentration of from 10 to 98%. When using the mineral acids as a catalyst it is advisable to add the catalyst in portions from time to time during the progress of the reaction rather than all at once at the start of the reaction. These acid catalysts lose much of their activity after having once been used in the reaction, but the activity may be restored by adding a small amount of anhydrous or concentrated acid to the spent acid. Reactivation can be accomplished by heating the spent acid catalyst to about 80° C.–120° C. for about an hour, cooling, and filtering through activated charcoal.

If it is desired to produce terpene mercaptans unmixed with terpene polysulphides, it is desirable to exclude air from the reaction mass in order to avoid oxidation of the mercaptans as formed. The same result may be accomplished by adding an anti-oxidant, as for example, hydroquinone, alpha naphthol, etc., to the reaction mixture. The presence of the anti-oxidant will also tend to prevent oxidation of the mercaptan after formation and during storage, shipment, etc.

On the other hand, if it is desired to produce terpene polysulphides, the terpene mercaptans may be oxidized to polysulphides as they are formed by introducing air or oxygen to the reaction zone along with the hydrogen sulphide or independently.

It will be understood accordingly that all examples given for the production of terpene mercaptans will serve likewise for the production of the corresponding terpene polysulphides, it being only necessary to supply air or oxygen to the reaction mixture.

No special form of apparatus is required to carry out the reaction in accordance with this invention. When atmospheric pressure is used, the reaction may be carried out in an open vessel; while reaction under superatmospheric pressure will be carried out in, for example, an autoclave.

The procedure in accordance with this invention for the production of terpene mercaptans and polysulphides is illustrated by the following examples:

Example I 30 parts by volume of sulphate pinene and 150 parts by volume of phosphoric acid (85%) were contacted with hydrogen sulphide at atmospheric pressure during eighteen hours, with agitation at about 22° C. The temperature rose to about 40° C. during the first few hours. Shortly after stopping the agitator, the product separated into layers. The upper layer comprising the treated pinene was drawn off and water washed. The product analyzed 12.8% sulphur, equivalent to a 68% yield of mercaptan.

Example II

To illustrate the added effect of contact catalysts, the above experiment was repeated using 1 part by weight of activated carbon in conjunction with the other reactants. Time, temperature, and pressure were the same in each case. The resulting product after water washing analyzed 17.7% sulphur, representing a 94.3% yield of mercaptan.

Example III 30 parts by volume of pinene were contacted with 125 parts by volume of 32% sulphuric acid and H₂S during twenty-four hours at room temperature and atmospheric pressure. The temperature rose to about 40° C. The water washed product analyzed 15.6% sulphur, indicating an 83% yield of mercaptans.

Sulphuric acid like phosphoric acid can be used in conjunction with absorbents such as activated carbon, silica gel, etc.

Example IV 30 cc. of dipentene and 125 cc. of 85% phosphoric acid were contacted with hydrogen sulphide during twenty-four hours at atmospheric pressure. The temperature rose to about 40° C. during the first few hours of the reaction. The separated product was water washed and analyzed as follows:

| | Percent |
|---|---|
| Sulphur | 9.1 |
| Mercaptans | 47.8 |

Example V 10 cc. of terpineol and 50 cc. of 85% phosphoric acid were contacted with hydrogen sulphide, at atmospheric pressure, during twenty-four hours.

The temperature rose to about 40° C. during the first few hours of the reaction. The product was drawn off and water washed. It analyzed as follows:

| | Percent |
|---|---|
| Sulphur | 10.4 |
| Mercaptans | 61 |

Example VI 15 parts by volume of pinene and 50 parts by volume of monoamylamine were contacted with $H_2S$ during twenty-four hours at about 5–10# gauge pressure and 80° C. The product was diluted with a small quantity of water to cause separation; the resulting upper oily layer was again water washed to remove all traces of the catalysts. The resulting product analyzed, sulphur 2.8%, equivalent to a 15.8% yield of mercaptans.

Example VII 10 parts by volume of turpentine, 10 parts by weight of slacked lime and 20 parts by weight of water were contacted with $H_2S$ during 60 hours at 22° C. The temperature rose to about 40° C. during the first few hours of the reaction. The treated turpentine was then water-washed and the resulting product analyzed 3.6% S and gave a positive test for mercaptans.

Example VIII 10 parts by volume of turpentine and 40 parts by volume of 90% acetic acid were contacted with $H_2S$ at 22° C. during forty-eight hours. The temperature rose to about 40° C. during the first few hours of the reaction. The water-washed product analyzed 12.7% S and gave a positive test for mercaptans.

Example IX 10 parts by volume of turpentine and 40 parts by volume of 32% $H_2SO_4$ were contacted with $H_2S$ at 22° C., and during 48 hours. The temperature rose to about 40° C. during the first few hours of the reaction. The water-washed product analyzed 16% S and gave a positive test for mercaptans.

Example X

The previous experiment was repeated at 80° C. in place of 22° C. The water-washed product gave a positive test for mercaptans and analyzed 25.4% S.

Example XI 10 parts by volume of turpentine and 20 parts by weight of $P_2O_5$ (the latter preferably added slowly and with cooling if necessary) were contacted with $H_2S$, at 22° C. during sixty hours. The temperature rose to about 40° C. during the first few hours of the reaction. The water-washed product gave a positive test for mercaptans and analyzed 14.9% S. This sulphur content is equivalent to an 84.2% yield in terms of mercaptans.

Example XII 10 parts by volume of turpentine and 40 parts by volume of 32% $H_2SO_4$ were contacted twenty-four hours with $H_2S$ at 70° C. The resulting water-washed product analyzed 17.35% S and gave a positive test for mercaptans.

Example XIII

The above experiment was repeated using 85% $H_3PO_4$ in place of 32% $H_2SO_4$. The water-washed product contained much water in suspension and required heating to remove the water by distillation. The resulting product analyzed 10.5% S and gave a positive test for mercaptans.

In all the examples the mercaptan content is that calculated from the sulphur content on the assumption that no side reactions took place.

Example XIV

Potassium hydroxide as a catalyst appears to cause the formation of sulphides or disulphides to the exclusion of mercaptans. Thus, 10 parts by volume of turpentine and 40 parts by volume of 40% KOH in 90% alcohol were contacted with $H_2S$, at 22° C., during a period of twenty-four hours. The product was water-washed. The resulting product analyzed 12.4% S. However, it gave a negative test for mercaptans.

The crude products as prepared in the above examples will comprise both terpene mercaptans and/or sulphides and the unreacted portion of the terpene compound used in the reaction. Simple fractionation, extraction, etc. will remove the unreacted terpenes, and produce the mercaptans or sulphides in high concentration and in a substantially pure state.

The following examples illustrate treatment of the so-called paramenthane cut and of a gasoline-terpene mixture in accordance with this invention:

Example XV 500 cc. of a gasoline-terpene mixture, as described above, 500 cc. of 85% phosphoric acid, and 6 g. of activated carbon were contacted with hydrogen sulphide at 20° C. and at a gauge pressure of 200–300 lbs. sq. in. for seven hours.

The original gasoline-terpene mixture analyzed as follows:

| A. S. T. M.—B. R | |
|---|---|
| 5% | —155.4° C. |
| 10 | —156.9 |
| 20 | —157.4 |
| 30 | —158.9 |
| 40 | —159.9 |
| 50 | —161.8 |
| 60 | —163.3 |
| 70 | —165.3 |
| 80 | —168.1 |
| 90 | —175.1 |
| 95 | —186.6 |
| D. F. | —197.1 |
| Unpolymerized residue | 28.5% |
| R. I. at 20° C. | 1.4552 |
| Sp. gr. at $\frac{15.6° C}{15.6° C}$ | 0.8338 |

The product, after treatment as above with hydrogen sulphide analyzed 13.22% sulphur. This product was then fractionated at atmospheric pressure through a three plate column with the following results:

| Fraction No. | Vapor temperature | Percent of original volume | Analysis | | |
|---|---|---|---|---|---|
| | | | Unpol. residue | Sulphur | R. I. |
| | ° C. | | Percent | Percent | |
| 1 | 135–149 | 10 | 73.5 | 0.4 | 1.4362 |
| 2 | 149–151 | 5 | 70.0 | .4 | 1.4372 |
| 3 | 151–159 | 10 | 62.7 | .4 | 1.4423 |
| 4 | 159–160 | 5 | 56.0 | .6 | 1.4483 |
| 5 | 160–166 | 10 | 40.5 | .9 | 1.4577 |
| 6 | 166–177 | 10 | 20.0 | 3.0 | 1.4723 |
| Residue | Above 177 | 50 | 0.7 | 20.2 | 1.5179 |

The residue constitutes substantially pure terpene mercaptans and sulphides.

Example XVI 500 cc. of paramenthane cut, as described above, 500 cc. of 85% phosphoric acid, and 6 g. of activated carbon were contacted with hydrogen sulphide at 20° C. and 200–300 lbs. sq. in. pressure for seven hours.

The original paramenthane cut analyzed as follows:

| A. S. T. M.—B. R. | 5%—164.0° C. |
|---|---|
| | 10 —164.5 |
| | 20 —165.2 |
| | 30 —165.5 |
| | 40 —166.0 |
| | 50 —166.7 |
| | 60 —167.3 |
| | 70 —168.5 |
| | 80 —170.3 |
| | 90 —173.5 |
| | 95 —180.2 |
| Unpolymerized residue | 8.8% |
| R. I. at 20° C. | 1.4641 |
| Sp. gr. at $\frac{15.6° C.}{15.6° C.}$ | 0.8487 |

The paramenthane cut, after treatment as above, analyzed 14.33% sulphur. This product was then fractionated through a three plate column at atmospheric pressure as above, with the following results:

| Fraction No. | Vapor temperature | Percent of original volume | Analysis Unpol. residue | Analysis Sulphur | Analysis R. I. |
|---|---|---|---|---|---|
| | ° C. | | Percent | Percent | |
| 1 | 155–162 | 5 | 42.0 | 0.2 | 1.4561 |
| 2 | 162–164 | 5 | 39.5 | .7 | 1.4581 |
| 3 | 164–166 | 5 | 38.5 | .9 | 1.4590 |
| 4 | 166–168 | 5 | 38.0 | 1.3 | 1.4602 |
| 5 | 168–169 | 5 | 34.0 | 1.7 | 1.4628 |
| 6 | 169–172 | 5 | 24.6 | 2.7 | 1.4695 |
| 7 | 172–177 | 5 | 14.7 | 4.6 | 1.4782 |
| 8 | 177–203 | 5 | 7.1 | 8.7 | 1.4852 |
| Residue | Above 203 | 60 | .2 | 20.8 | 1.5140 |

The residue from the above fractionation had the following A. S. T. M. boiling range:

| | 5%—219.0° C. |
|---|---|
| | 10 —221.5 |
| | 20 —224.5 |
| | 30 —227.0 |
| | 40 —231.5 |
| | 50 —234.5 |
| | 60 —238.0 |
| | 70 —243.0 |
| | 80 —247.0 |
| | 90 —251.0 |
| | 95 —267.5 | and consisted of substantially pure terpene mercaptans and sulphides.

The terpene mercaptans and sulphides in accordance with this invention may be used as flotation agents in the flotation refining of ores, or they may be used as raw materials for the production of the corresponding sulphonic acids, trithiocarbonates, etc., which are of value as wetting out agents, flotation agents, organic intermediates, etc.

This application is filed as, and constitutes, a continuation in part of our copending application Serial No. 713,304, filed February 28, 1934.

What we claim and desire to protect by Letters Patent is:

1. The method of producing a sulphur-containing terpene compound which includes reacting an unsaturated terpene compound with hydrogen sulphide in the presence of a catalyst selected from the group consisting of acidic catalysts, basic catalysts, contact catalysts, dimethyl sulphate, metallic aluminum and metal sulphides.

2. The method of producing a sulphur-containing terpene compound which includes reacting an unsaturated terpene compound with hydrogen sulphide at a temperature adapted to promote the reaction.

3. The method of producing a sulphur-containing terpene compound which includes reacting an unsaturated terpene compound with hydrogen sulphide at a temperature adapted to promote the reaction and in the presence of a catalyst selected from the group consisting of acidic catalysts, basic catalysts, contact catalysts, dimethyl sulphate, metallic aluminum and metal sulphides.

4. The method of producing a sulphur-containing terpene compound which includes reacting an unsaturated terpene compound with hydrogen sulphide under pressure.

5. The method of producing a sulphur-containing terpene compound which includes reacting an unsaturated terpene compound with hydrogen sulphide at a temperature of from about 0° C. to about 300° C.

6. The method of producing a sulphur-containing terpene compound which includes reacting an unsaturated terpene compound with hydrogen sulphide in the presence of an acid.

7. The method of producing a sulphur-containing terpene compound which includes reacting an unsaturated terpene compound with hydrogen sulphide in the presence of an acid anhydride.

8. The method of producing a sulphur-containing terpene compound which includes reacting an unsaturated terpene compound with hydrogen sulphide at a temperature adapted to promote the reaction and in the presence of an acid.

9. The method of producing a sulphur-containing terpene compound which includes reacting an unsaturated terpene compound with hydrogen sulphide at a temperature adapted to promote the reaction and in the presence of an acid anhydride.

10. The method of producing a sulphur-containing terpene compound which includes reacting an unsaturated terpene compound with hydrogen sulphide.

11. The reaction product of an unsaturated terpene compound and hydrogen sulphide.

12. The reaction product of pinene and hydrogen sulphide.

13. The method of producing a sulphur-containing terpene compound which includes reacting an unsaturated terpene compound with hydrogen sulphide in the presence of a base.

14. The method of producing a terpene mercaptan which includes reacting an unsaturated terpene compound with hydrogen sulphide in the absence of oxygen.

15. The method of producing a terpene sulphide which includes reacting an unsaturated terpene compound with hydrogen sulphide in the presence of oxygen.

16. The method of producing a sulphur-containing terpene compound which includes treating a mixture comprising an unsaturated terpene compound and gasoline with hydrogen sulphide at a temperature adapted to promote reaction between the hydrogen sulphide and the unsaturated terpene compound and separating sulphur-containing terpene compound in substantially pure form from the resultant mixture.

17. The method of producing a sulphur-containing terpene compound which includes treating a mixture comprising an unsaturated terpene compound and gasoline with hydrogen sulphide at a temperature adapted to promote reaction between the hydrogen sulphide and the unsaturated terpene compound, distilling off unreacted materials and recovering sulphur-containing terpene compound in substantially pure form.

18. The method of producing a sulphur-containing terpene compound which includes treating a mixture comprising an unsaturated terpene compound and a saturated terpene compound with hydrogen sulphide at a temperature adapted to promote reaction between the hydrogen sulphide and the unsaturated terpene compound and separating sulphur-containing terpene compound in substantially pure form from the resultant mixture.

19. The method of producing a sulphur-containing terpene compound which includes treating a mixture comprising an unsaturated terpene compound and a saturated terpene compound with hydrogen sulphide at a temperature adapted to promote reaction between the hydrogen sulphide and the unsaturated terpene compound, distilling off unreacted materials and recovering sulphur-containing terpene compound in substantially pure form.

20. The reaction product of dipentene and hydrogen sulphide.

21. The reaction product of terpineol and hydrogen sulphide.

22. The method of producing a sulphur-containing terpene compound which includes reacting an unsaturated terpene compound with hydrogen sulphide in the presence of phosphoric acid.

23. The method of producing a sulphur-containing terpene compound which includes reacting an unsaturated terpene compound with hydrogen sulphide in the presence of an amine.

24. The method of producing a sulphur-containing terpene compound which includes reacting an unsaturated terpene compound with hydrogen sulphide in the presence of a mixed catalyst comprising a contact catalyst and a catalyst selected from the group consisting of acidic catalysts and basic catalysts.

25. The method of producing a sulphur-containing terpene compound which includes reacting an unsaturated terpene compound in solution in a solvent therefor with hydrogen sulphide.

26. A terpene mercaptan.

JOSEPH N. BORGLIN.
EMIL OTT.